Feb. 27, 1951 H. GUTTON ET AL 2,543,627
GUIDE FOR RADIO-ELECTRIC WAVES ASSOCIATED WITH ELEMENTS
FOR REGULATING THE PROPAGATION OF SAID WAVES
Filed July 19, 1946

Inventors
HENRI GUTTON +
ANTOINE JEAN ORTUSI
By Haseltine Lake & Co.
Attorneys

Patented Feb. 27, 1951

2,543,627

UNITED STATES PATENT OFFICE 2,543,627

GUIDE FOR RADIO-ELECTRIC WAVES ASSOCIATED WITH ELEMENTS FOR REGULATING THE PROPAGATION OF SAID WAVES

Henri Gutton and Antoine Jean Ortusi, Paris, France, assignors to Compagnie Generale de Telegraphie Sans Fil, a corporation of France Application July 19, 1946, Serial No. 684,818
In France November 14, 1944

Section 1, Public Law 690, August 8, 1946
Patent expires November 14, 1964

1 Claim. (Cl. 178—44)

This invention relates to guides for radio-electric waves associated with elements for regulating the propagation of said waves.

The invention has a double object, (1) to provide in an electromagnetic guide, a wave filter element allowing the passage of a frequency band by means of a narrow slot of suitable dimensions and shape made in a conductive partition arranged in the interior of the guide perpendicularly to the walls thereof, and (2) to provide a filter element arresting a frequency band by means of a narrow slot of suitable dimensions and form, made in the lateral wall of the guide.

As regards the first of these objects, experience has shown that certain forms and dimensions of the aperture give a reflected wave lagging with respect to the total reflection on a solid flat metal wall, whilst other forms and dimensions of aperture give a reflected wave in advance. Everything takes place as if an obstacle constituted by a metal wall bored with any aperture behaved, in a guide according to its shape, its dimensions and its arrangement, sometimes as a self-inductance in parallel and sometimes as a capacity. Consequently, by a suitable choice of these different elements, it will be possible to manage in such manner that the self-induction part of the slot compensates for the capacitative part and that the transmission of the wave in the guide is total for a band of given frequency, the width of which is determined by the shape of the aperture.

The following examples of the invention which are given purely for purposes of illustration of the invention and without any limitation of the foregoing principle thereof, either as to the nature of the wave, the form of the slot or the form of the guide, will enable this first object of the invention to be better understood. The said examples of the invention will be described with reference to the accompanying drawing.

Figure 1:
Figure 4:
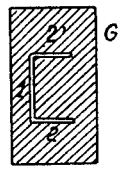
Figure 5:
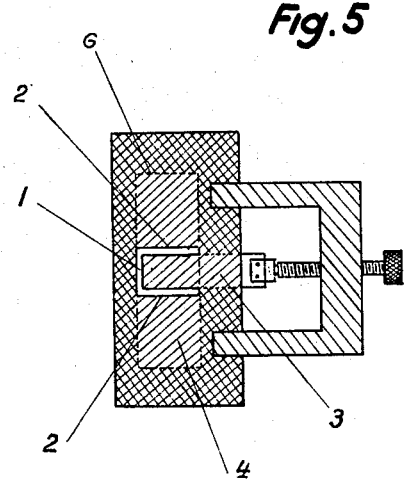

In the accompanying drawing Figures 1 to 4 are diagrammatic cross sections through guides having slots according to the invention and Figure 5 is a similar cross section through a guide having regulating means in accordance with the present invention.

In a conductive partition normal to the walls of a rectangular guide, the lines of current created by the circulation of the magnetic wave $H_{01}$ are parallel to the small side, with a maximum intensity at the centre, and zero at the upper and lower extremities. If there be made in this partition a slot normal to the lines of current, the electric field shows itself between the two lips of the slot. Experience shows that there exists, for a given position in the partition, a collection of heights of slot for which the effect of self-induction may be compensated by an effect of capacity by causing the width of the slot to vary. The diaphragm then allows the passage of a wave of definite frequency, reflecting all other frequencies. Such a rectangular slot, shown at F in Figure 1 of the drawings, normal to the lines of current in a rectangular guide, shown at G, thus constitutes a filter element according to the invention.

Figure 2:
Figure 3:
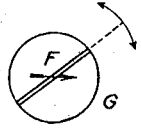

According to another example of the invention, there is used in a conductive partition normal to the guide, a fine slot, the orientation of which with respect to the lines of current is variable (see Figure 2). When the slot is perpendicular to the lines of current, the obstacle behaves as a capacity and when it is parallel, as self-inductance. In the case of an intermediate orientation and for a given frequency, the transmission through the slot will thus be total. This orientation is indicated by the arrows pointing oppositely from the longitudinal axis of the slot in Figures 2 and 3. It will be understood that the regulation of the filter according to this example is easy and its use in a circular guide (see Figure 3) is particularly advantageous. Means for rotating in its plane a partition normal to the axis of a tube is per se known, together with means for actuating it from outside the tube; and any suitable form thereof may be used to effect the aforesaid orientation.

According to another example, a slot is utilised having the form of a U (see Figure 4). By modifying the vertical and horizontal dimensions 2, 2' there may be constituted a filter element allowing the passage of the desired frequency band. In practice, for example, the width of the slot I (Figure 5) is varied, without modifying the width of the other branches 2, 2' of the U, by means of a slide 3 which enters to a greater or lesser extent with a rectangular aperture provided in a conductive partition 4 normal to the guide G. Everything then takes place as if the base I of the U formed a capacity, the branches 2, 2' acting as self-inductances. It is advantageous to shape the aperture in such a manner as to avoid sharp angles as these tend to occasion ohmic losses in the currents.

As regards the second object of the invention, experience has also shown that an aperture made in the lateral wall of a guide traversed by an electromagnetic wave still behaves either as a self-inductance or as a capacity. For example, a slot made in the lateral wall of a rectangular guide, parallel to the direction of the current, behaves as a self-inductance, whilst a slot perpendicular to this same direction behaves as a capacity. By a suitable choice of the shape, dimensions and arrangement of the aperture in the wall of the guide, it is therefore possible so to arrange things that the self-inductance and the capacitative parts compensate each other. Here, however, the effect of this compensation will be to arrest a frequency band, the width of which is determined by the shape of the aperture. By means of such an aperture, of which many practical embodiments can be visualised, elements of filters are thus constituted capable of arresting practically any band of frequency as desired.

What we claim is:

An ultra-short wave band-pass filter which comprises, in combination, a dielectric wave guide of the hollow-pipe type and a conductive diaphragm located in a section of said wave guide normal to its longitudinal axis and rotatably adjustable in the plane of said section, said diaphragm comprising a slot so shaped and positioned in the diaphragm that when rotated in the plane of the diaphragm the mean frequency of the pass-band of said filter is varied.

HENRI GUTTON.
ANTOINE JEAN ORTUSI.

REFERENCES CITED

The following references are of record in the file of this patent:

UNITED STATES PATENTS

| Number | Name | Date |
|---|---|---|
| 2,206,683 | Wolff | July 2, 1940 |
| 2,407,069 | Fiske | Sept. 3, 1946 |
| 2,412,446 | De Walt | Dec. 10, 1946 |
| 2,423,130 | Tyrrell | July 1, 1947 |